(12) United States Patent
Choy

(10) Patent No.: US 7,821,780 B2
(45) Date of Patent: Oct. 26, 2010

(54) DUAL SCREEN PRESENTATION NOTEBOOK COMPUTER

(76) Inventor: Heng Kah Choy, Room 7201 Times Manor, No. 18 Hongjun Ying Dong Road, Chaoyang District, Beijing (CN) 100012

( * ) Notice: Subject to any disclaimer, the term of this patent is extended or adjusted under 35 U.S.C. 154(b) by 0 days.

(21) Appl. No.: 12/176,361

(22) Filed: Jul. 19, 2008

(65) Prior Publication Data
US 2009/0296331 A1  Dec. 3, 2009

Related U.S. Application Data

(60) Provisional application No. 60/950,871, filed on Jul. 19, 2007.

(51) Int. Cl.
*H05K 7/16* (2006.01)

(52) U.S. Cl. .............. 361/679.06; 345/168; 455/556.1; 726/18; 248/346.01; 165/80.4

(58) Field of Classification Search .............. 345/156, 345/169, 659; 455/575.3, 556.1, 550.1; 341/34; 726/8, 18; 248/346.01; 165/80.4; 361/679.05, 361/679.06, 679.08, 679.09, 679.29, 679.41
See application file for complete search history.

(56) References Cited

U.S. PATENT DOCUMENTS

| | | | |
|---|---|---|---|
| 6,094,341 A | 7/2000 | Lin | |
| 6,353,529 B1 * | 3/2002 | Cies | 361/679.05 |
| 6,628,267 B2 * | 9/2003 | Karidis et al. | 345/168 |
| 7,136,282 B1 | 11/2006 | Rebeske | |
| 2003/0142469 A1 | 7/2003 | Ponx | |
| 2005/0237269 A1 | 10/2005 | Connor et al. | |
| 2008/0062625 A1 * | 3/2008 | Batio | 361/680 |
| 2009/0113465 A1 * | 4/2009 | Tsuji | 720/728 |

* cited by examiner

*Primary Examiner*—Hung V Duong
(74) *Attorney, Agent, or Firm*—David Aker

(57) ABSTRACT

A dual screen presentation notebook having components that are integrally connected together to allow easy viewing of presentation materials without the users having to sit side by side craning their necks close together facing the same direction but instead can face opposite one another. When the dual screen presentation notebook is switched on, users can either (i) view identical or mirror images of the presentation materials or (ii) different images on the two monitor screens. The dual screen presentation notebook can be easily converted into a tablet computer and can also be used for other applications such as viewing electronic book, electronic photograph and images, videos, movies, etc.

20 Claims, 12 Drawing Sheets

DUAL SCREEN PRESENTATION NOTEBOOK COMPUTER

This application claims priority under 35 U.S.C. §119(e) from U.S. provisional patent application Ser. No. 60/950,871 filed on Jul. 19, 2007, the entire contents of which is incorporated herein by reference.

BACKGROUND OF THE INVENTION

1. Field of the Invention

The present invention relates to the field of personal computers. More particularly, it relates to portable computers such as notebooks and laptop computers having a unique arrangement of two (2) monitor screens made available to enable easy viewing of either the same or different images on the monitor screens, without the users having to sit side by side craning their necks close together facing the same direction but opposite one another.

2. Background Art

First generation personal computers are basically made up of a computer monitor, a central processing unit (CPU) console and a keyboard. This basic configuration of a computer set-up, albeit with some minor modifications, still remains the main set-up and configuration for the desktop computers till today.

Given the technological advancement and capability of the day, the desktop computer was in general, suitable for most office applications. However, as it was big and cumbersome in size, it did not allow for easy transportation. There was a huge demand for smaller size computers which are portable and which would allow users to easily carry the computers for business presentations to clients or to continue their work at home. With significant advancement in wafer technologies, this led to the development of smaller and faster micro-processors. These technological breakthroughs enabled the computer industry to create and design a new breed of computers (known by various names) such as portable computers, laptop computers or notebooks. These computers were designed to be easily transportable from place to place and allowed users to take their work with them. The basic design of the notebook consists of a clamshell-like case that contained a monitor screen on the top side and a keyboard on the bottom side, when the notebook is opened.

The portable computer addressed the transportability problem, but it's small single monitor screen and keyboard design was limiting for some applications especially in the field of sales and marketing. Billions of dollars of sales revenue are generated each year by sales professionals or "road warriors" for their respective companies throughout the world. With the current design of the notebook, the sales professional is often not able to give an effective sales and marketing presentation to his/her client due to the single small monitor screen of the notebook. In some instances, he/she was forced to purchase more than one notebook in order to give a more convincing sales pitch to his/her customer in order to secure the deal. Having to use more than one notebook to give an effective presentation is both cumbersome (as he/she has to carry more than one notebook to make the presentation) and expensive (as more than one notebook must be purchased).

In the field of sales and marketing, the livelihood of sales professionals and the dollar revenue that can be earned by their respective companies are dependant to a large extent on the effectiveness of the sales professional in delivering a high-powered and convincing sales pitch to their clients so that they can win the order from their clients for their respective companies. The current notebook computer available in the market today is inherently limiting as the sales professional's client has to sit side by side in close proximity to the sales professional, facing the same direction, in order to be able to view the presentation materials clearly. This limitation is a function of the current design of the computer notebook, which contains only a small single monitor screen.

The following art describes the present status of portable computers in this field:

a) Ambroe, U.S. Pat. No. D397,998 describes a closable display device design.

b) Batio, U.S. Pat. No. 5,949,643 describes a retrofitting, folding, portable keyboard for a notebook computer consisting of two, pivotally-hinged halves. The two halves are hinged so that they may assume a perfectly flat, horizontal position, or, alternatively, a laterally raised and sloping configuration that provides an enhanced, ergonometric configuration to the user. Each half has its own set of keys and space bar. The keyboard of the invention has its own pointing device that takes over the pointing function of the pointing device of the dedicated keyboard provided with the notebook computer. The portable, folding keyboard of the invention also has a joystick-adapter by which a conventional joystick may be operatively coupled to the notebook computer by which games may be played. Four, bottom, pivotal feet support the keyboard on and/or above the existing keyboard provided with the notebook computer. A carrying case is provided in which the folded-up keyboard may be stored and transported. Also provided is a dual split screen, where each half of the split screen is pivotally mounted for universal rotation.

c) Buisson et. al., U.S. Pat. No. 4,988,995 describes a display device including several flat screens. Two sides of a case each form a flat screen display face controlled by the same control system. Under normal operation, the case is held in slides and only the screen disposed on one side is visible and in the emergency mode the case is pulled out of the slides and is pivoted so as to cause the other screen disposed on the other side to appear.

d) Chee, U.S. Pat. No. 5,694,141 describes a computer system including a pair of display devices, such as cathode ray tubes (CRT's) or liquid crystal displays (LCD's) for providing a visible display to a user of the computer system. The computer system includes a video display controller (VDC) providing for simultaneous display of different images on the pair of display devices. The VDC includes a display data processing circuit (DDPC) which is variably configurable to provide decoding of data words from a first bit-word format as received from a display first-in-first-out (FIFO) memory to a second bit-word format as required by a particular one of the pair of display devices. The DDPC is variably configurable to allow the pair of display devices to each receive driving signals providing the simultaneous differing images, and which driving signals originate with the bit-words allocated to each particular one of the pair of display devices. Accordingly, the DDPC simultaneously decodes bit-words from the first bit-word format to a pair of second bit-word formats, which second bit-word formats need not be the same, but can differ depending on the type of display device receiving the corresponding driving signals.

e) Chee et. al., PCT Publication WO 96/41328 describes a computer system including a dual-panel monochrome or color liquid crystal display (LCD). A dynamic random access memory (DRAM) of the computer including a defined virtual memory array representative of pixel locations of the dual-panel LCD. Pixel values are read from the virtual array of the DRAM and written to corresponding locations of the display by a display pipeline. The writing of pixel values to the display proceeds pixel-by-pixel across a row of pixels in a panel, and then to the next row of pixels until a panel is refreshed. The panels of the array are refreshed one at a time alternating between an upper panel of the display and a lower panel of the display. While one panel is being refreshed, the other panel is blanked. Consequently, the dual-panel display may be driven with a simplied structure of display pipeline and with a reduced time requirement for access to the DRAM.

f) Duquette et. al., US Pat. Publication No. 2003/0095373A1 describes a display apparatus comprising a device enclosure supporting a front panel and a monitor housing supporting a first monitor screen. The monitor housing is pivotally engaged with the device enclosure, and enabled for pivotal movement between a closed position wherein the first monitor screen is approximately parallel to front panel, and an open position, placing the first monitor screen at an angle to the front panel. A sliding assembly supports a second monitor screen. The sliding assembly is enabled for sliding movement between a concealed position within the monitor housing and a viewing position lateral to the monitor housing. The sliding assembly is further enabled, when placed in the viewing position, for pivotal movement relative to the monitor assembly for improved viewing, jointly, of the first and the second monitor screens.

g) Haneda et. al., U.S. Pat. No. 5,900,848 describes an information processing apparatus having a main body and a lid body configured so that the lid body can be switched between a closed state, a stacked state, a double screen state and an inverted state. Each of the main body and the lid body has a display section for displaying information and an input section composed of a transparent tablet and provided on the display section. As a sensor or the like detects the lid body in one of the four states, a control section of the information processing apparatus controls the display section so that a screen on the display section is appropriate to the detected state of the lid body. The control section also controls the lighting section for lighting the display section appropriately to the detected state of the lid body. This realizes appropriate display in accordance with usages of the information processing apparatus and offers an easy-to-operate and easy-to-use information processing apparatus. Besides, the lighting section is turned on/off according to needs, and therefore it is possible to prevent heat generation and to restrain power consumption.

h) Kuno et. al., U.S. Pat. No. 5,467,102 describes a portable display device capable of presenting a document in an easy to read format, in which a simultaneous display of different parts of the document in reasonable sizes can be made, by a simple operation of the device. The display device comprises a document memory for storing documents to be displayed, at least two display screens for displaying the documents stored in the document memory means, and a display control unit for controlling displays of the documents on the display screens to be in a linked mode in which the displays on the display screens are linked together and in a separate mode in which the displays on the display screens are independent from each other.

i) Leveridge et. al., U.S. Pat. No. D395,041 describes a computer monitor assembly design.

j) Moscovitch, U.S. Pat. No. RE36,978 describes a display system including a base, a pair of electronic displays, and an arm assembly that supports the displays from the base in vertical or horizontal registration. In one implementation, the arm assembly is a single telescopic member that rotates relative to the base and locks in vertical and horizontal orientations, the displays rotate relative to the member between corresponding extreme angular positions in which the operative angular orientation of the displays relative to horizontal is maintained, and the length of the member is adjusted to minimize separation of the displays. In another implementation, the arm assembly has separate arms rotating about vertically spaced axes and linked to minimize the separation of the displays automatically when vertically or horizontally registered. In a simple implementation, the arm assembly is a rigid arm that releasably attaches to the base only in vertical and horizontal orientations, the displays mounted releasably to the arm in pre-defined angular orientations that preserve their operative angular orientation, and one display can be connected to the arm at spaced apart position to adjust separation of the displays.

k) Ouchi et al, U.S. Pat. No. 5,796,577 describes a notebook computer comprising a keyboard positioned on the upper surface of a computer body, an operating ball, function keys and the like. A cover member fixed to the computer body by a hinge so that it opens and closes against the computer body, is supported in an open position substantially perpendicular to the body. A first display device is formed on the inner surface of the cover member, and a second display device is formed on the outer surface thereof. The operator and the client facing each other with the notebook computer positioned between them could share the same screen information by watching each of the two display devices in front of them.

l) Reddy et. al., U.S. Pat. No. 6,215,459 describes a video controller for controlling at least two video displays incorporating a video memory for storing first and second video frames of interleaved pixel data. A video memory controller connected to the video memory sequentially reads data for a first pixel from the first video frame and data for a second pixel from the second video frame. Each pixel data is in turn transferred to a look-up table connected to the video memory controller which converts the first and second pixel data to first and second display data. A selector coupled to the look-up table alternately routes the first display data to one video display and routes the second display data to the other video display.

m) Sullivan, U.S. Patent Publication No. 2003/0179541, describes a double screen portable computer containing a left side video screen and a right side video screen, at least one of which is touch or energy sensitive, said screens being connected to one or more CPUs, and said CPUs sharing other peripheral devices and communicating with each other, where the input device is a pen stylus, thus obviating the need for a keyboard.

In very general terms, the prior art teaches the use of dual screen monitors. Ouchi et al. describe a method which enable the operator and the client facing each other with the notebook computer positioned between them to share the same screen information by watching each of the two display devices in front of them. However, both parties need to stoop down to achieve a line of sight that is substantially perpendicular (ca. 90 degrees) to the monitor screens.

The present invention fulfills the needs and allows users to view either the same or different presentation materials easily and effectively on separate monitor screens, whilst seated comfortably opposite one another. Further related advantages of the present invention are as described in the following summary.

SUMMARY OF THE INVENTION

Accordingly, in order to overcome these difficulties, several objects and advantages of the invention are described below:

(a) A primary objective of the present invention is to provide a dual screen presentation notebook and method of use that provides advantages not taught by prior art.

(b) It is an objective of this invention to provide a dual screen presentation notebook that has two monitor screens which will allow users to either (i) view simultaneously, identical or mirror images of the presentation materials or (ii) at the touch of a keyboard button, mouse or other buttons integral to the computer arrangement, show a different image on the two monitor screens. The idea behind this design is that the user may want to check or see something that he/she does not want his/her client to see (for example to look at his/her internal cost data), while he/she is making a presentation to the client on the external price data. The present invention will also greatly enhance the screen-viewing satisfaction and capability for the users.

(c) In accordance with an objective of the invention, a portable computer arrangement that includes a clamshell case containing a four component system, comprises a keyboard portion having a keyboard and other computer hardware; a standard screen portion that is pivotally connected to the keyboard portion so as to pivot away from the keyboard portion and to pivot to cover the keyboard portion; a presentation screen portion that is pivotally connected to the standard screen portion so as to pivot away from a back of the standard screen portion and to pivot to cover the back of the standard screen portion; and a cover portion that is pivotally connected to the presentation screen portion so as to pivot away from the presentation screen portion and to pivot to cover the presentation screen portion. The cover portion also pivots with respect to the presentation portion to a position wherein a part of the cover portion is in contact with a bottom surface of the keyboard portion.

(d) A further objective of this invention is that the design of the presentation notebook computer is unique in that it contains a triple lock arrangement. When the user is not giving a presentation to a client, he/she opens the first lock (Lock 1) which will open the Standard Screen and he/she can then use the notebook computer the normal way notebook computers are used. When the user is going to give a presentation to a client, he/she will then also open the second lock (Lock 2) and third lock (Lock 3) respectively. The second lock (Lock 2) serves two purposes i.e. (a) to open the Presentation Screen and (b) to simultaneously activate the Presentation Screen. The idea behind this invention is that unless the Presentation Screen is opened, this monitor screen will not be illuminated and thus it will save and prolong the notebook computer's battery power when the user is using the notebook computer for his normal work. Locks (1) and (3) are located in front of the user whilst Lock (2) is located at the back, i.e. facing the customer. The location of the locks are designed and arranged to facilitate the opening of the Presentation Screen to enable the customer to view the presentation easily and effectively.

(e) Another objective of the invention is to provide a dual screen presentation notebook arrangement that consists of a clamshell case containing four component systems i.e.

(i) A protective device enclosure called a "Cover", similar to the primary casing of a commercial notebook computer. The Cover of the presentation notebook has a lock (Lock 3) and this lock is located in front i.e. facing the user. When the user pushes his/her thumb to the left (or right) on Lock (3), it opens and separates the Cover from the Presentation Screen.

(ii) A "Presentation Screen" whereby the user's client can sit comfortably opposite the user and separately view the presentation being made by the user (without having to sit side by side close to the user). The Presentation Screen has a lock (Lock 2) and this lock is located at the back; i.e. facing the customer.

(iii) A "Standard Screen" whereby the user can view his/her presentation materials while he/she is conducting the presentation. The Standard Screen has a lock (Lock 1) and this lock is located in front; i.e. facing the user. When the user is not giving a presentation to a client, he/she opens the first lock (Lock 1) which will open the Standard Screen and he/she can then use the notebook the normal way notebook computers are used.

(iv) A "Keyboard" with the relevant controls and the CPU's built underneath it, as is typical with a commercial notebook computer.

(f) A further objective of the invention is to enable the easy storing of two monitor screens in a single integral assembly when not in use.

(g) Another objective of the invention is to enable users to use the dual screen presentation notebook as a tablet computer, i.e. to function as a writing-based personal computer without the need to use a keyboard.

(h) A further objective of the present invention is to provide a dual screen presentation notebook that can be used for other current evolving applications such as for electronic book viewing, electronic photograph viewing, etc. Having a dual screen presentation notebook may spur the use of e-books because it will provide convenient portable viewing surfaces for more than one audience at a time. Likewise, the viewing of videos, movies, electronic photographs and images, etc. will also be easier and more enjoyable with such a dual screen presentation notebook. Users can be seated opposite one another and can view what is displayed with ease together, at the same time.

(i) Further objects and advantages of the invention include its simplicity of use and ease of closure of the dual screen presentation notebook when the presentation is completed. Other objects and advantages of the present invention will become apparent from a consideration of the ensuing description and drawings given below.

The objects of the invention are achieved by a dual screen presentation notebook arrangement that comprises a clamshell case containing a dual monitor screen located on the top side and a keyboard on the bottom side. The two monitor screens are integrally connected to allow the simultaneous viewing of either the same or different presentation materials on separate monitor screens by users without the users having to sit side by side craning their necks close together facing the same direction but opposite one another.

In accordance with the present invention, a dual screen presentation notebook may increase the growth of the portable computer market segment. In the business arena, sales professionals can use this new invention to increase sales revenues by being able to give very effective sales presentations to their clients, since they do not require that their client relocate to sit side by side with them facing the same direction to view the sales presentation, but instead the client may do so in comfort seated where he/she typically does i.e. opposite the sales professional. Other users can also benefit from the present invention by being able to have a better user experience in enjoying e-books (sharing and reading of e-books by more than one user at a time since the dual monitor screens provides convenient portable viewing surfaces). Likewise, the sharing and viewing of videos, movies, electronic photographs and images, etc. can also be easier and more enjoyable with such a dual screen presentation notebook.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
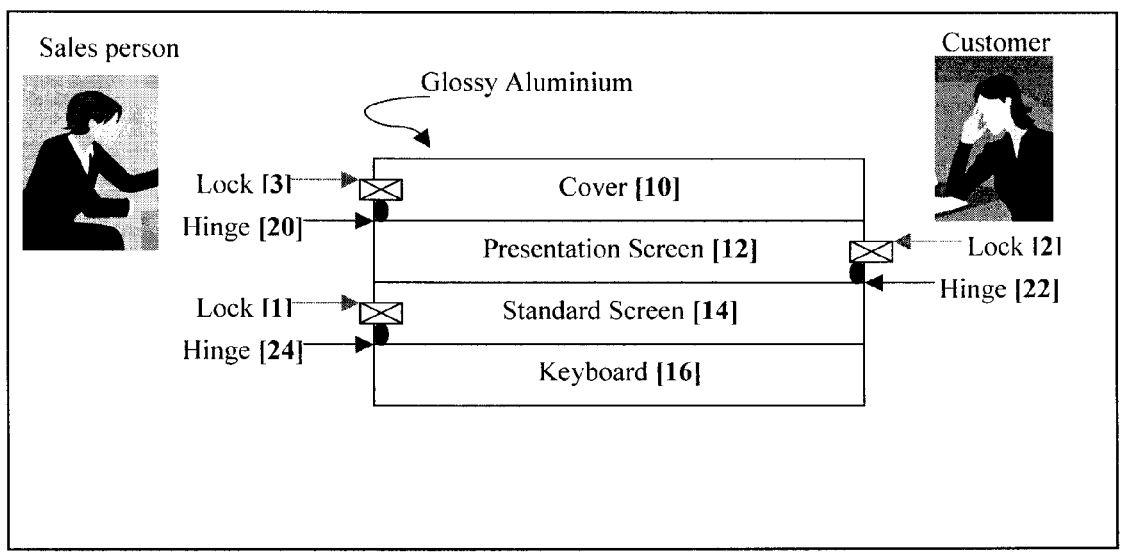
FIG. 1 is a left hand side view of the dual screen presentation notebook of the present invention, when closed.

FIG. 1 is the left hand side view of the dual screen presentation notebook, when closed. The dual screen presentation notebook consists of four component systems i.e.:

(a) A protective device enclosure called the "Cover" 10, similar to the primary casing of a commercial notebook computer.

The front of the Cover 10 is made of glossy aluminium or any other suitable light-weight metals (which are acceptable to users). The Cover 10, is fixed to pivot so as to open and close against the Presentation Screen 12, by hinges 20.

(b) A "Presentation Screen" 12, whereby the user's client can easily and separately view the presentation being made by the user (without having to sit side by side close to the user but opposite the user). The Presentation Screen 12 is fixed to pivot so as to open and close against the Standard Screen 14, by hinges 22.

(c) A "Standard Screen" 14, whereby the user can view his/her presentation materials while he/she is conducting the presentation. The Standard Screen 14, is fixed to open and close against the Keyboard 16, by hinges 24.

(d) A "Keyboard" 16, with the relevant controls, the CPU's and the associated hardware built underneath it, as is typical with a commercial notebook computer.

The dual screen presentation notebook contains a unique triple lock arrangement. Unlike normal notebooks, when the three locks are opened, the clamshell of the invention here is designed to open up to reveal two monitor screens i.e. the Presentation Screen 12, and a Standard Screen 14, during presentation. The location of each lock can be clearly seen from FIG. 1.

Figure 2:
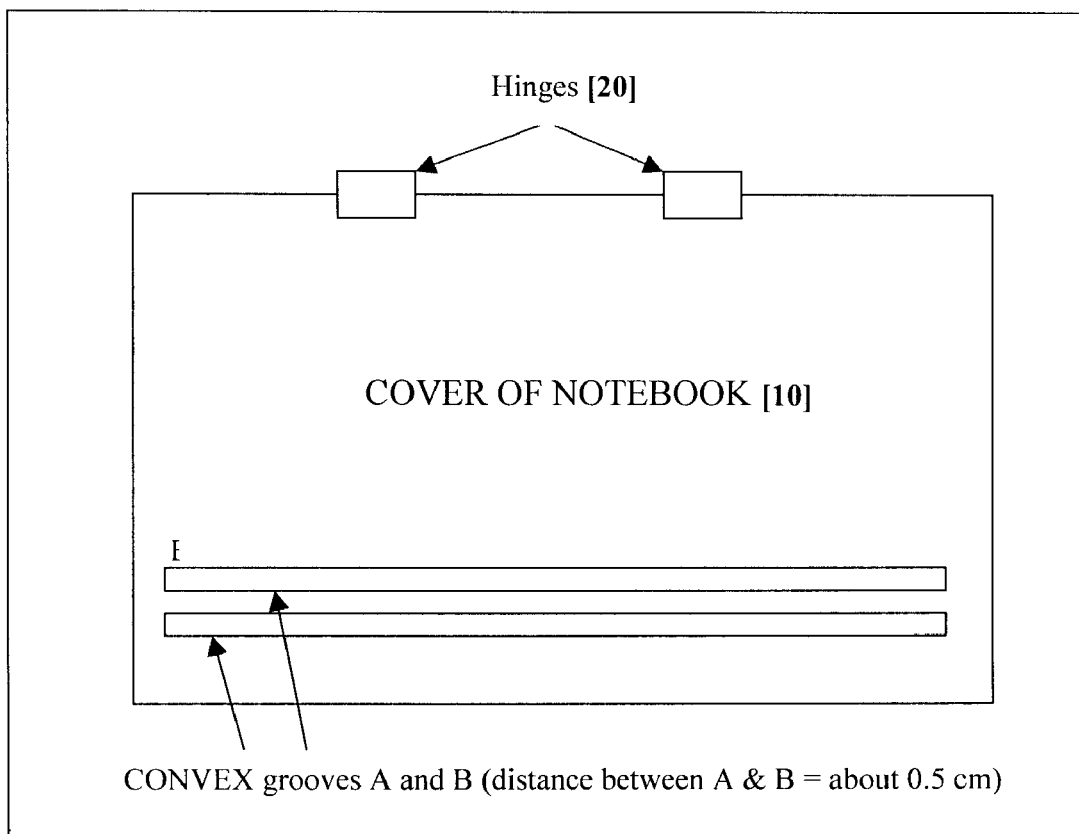
FIG. 2 is the top view of the cover of the dual screen presentation notebook of the present invention, showing hinges and convex ridges A and B.

FIG. 2 is the top view of the Cover 10, of the dual screen presentation notebook. It contains two generally parallel convex ridges A and B on the front of the Cover 10 and the distance between the two convex ridges A and B is approximately 0.5 cm. The Cover of the presentation notebook has a lock (Lock 3) and this lock is located in front i.e. facing the user. When the user pushes his/her thumb to the left (or right) on Lock (3), it opens and separates the Cover 10 from the Presentation Screen 12.

Figure 3:
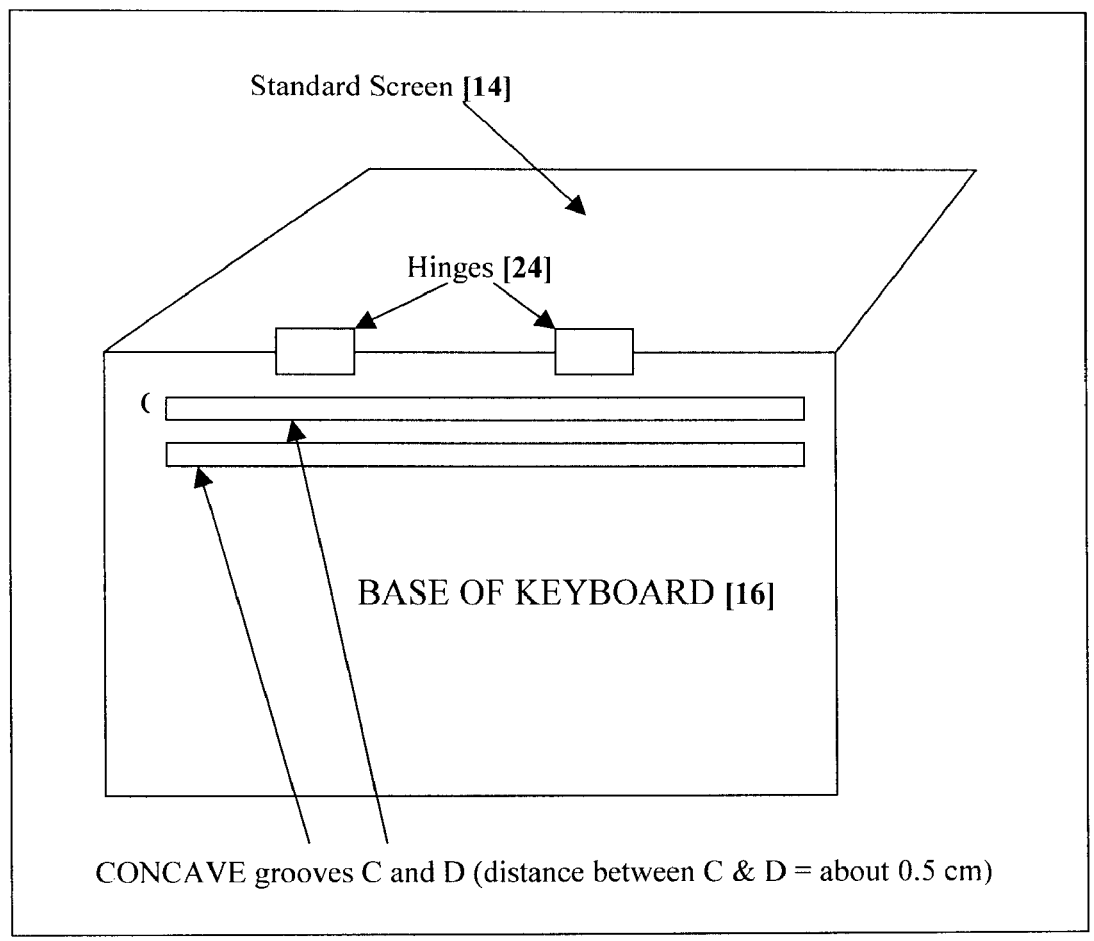
FIG. 3 is the front view of the base of the keyboard of the dual screen presentation notebook of the present invention, showing hinges to the standard screen and concave grooves C and D.

FIG. 3 is the front view of the base of the Keyboard 16, of the dual screen presentation notebook. There are two concave grooves C and D on the base of the Keyboard. The distance between the two concave grooves C and D is approximately 0.5 cm. The Standard Screen 14, is fixed to pivot so as to open and close against the Keyboard 16, by hinges 24.

Figures 4, 4A:
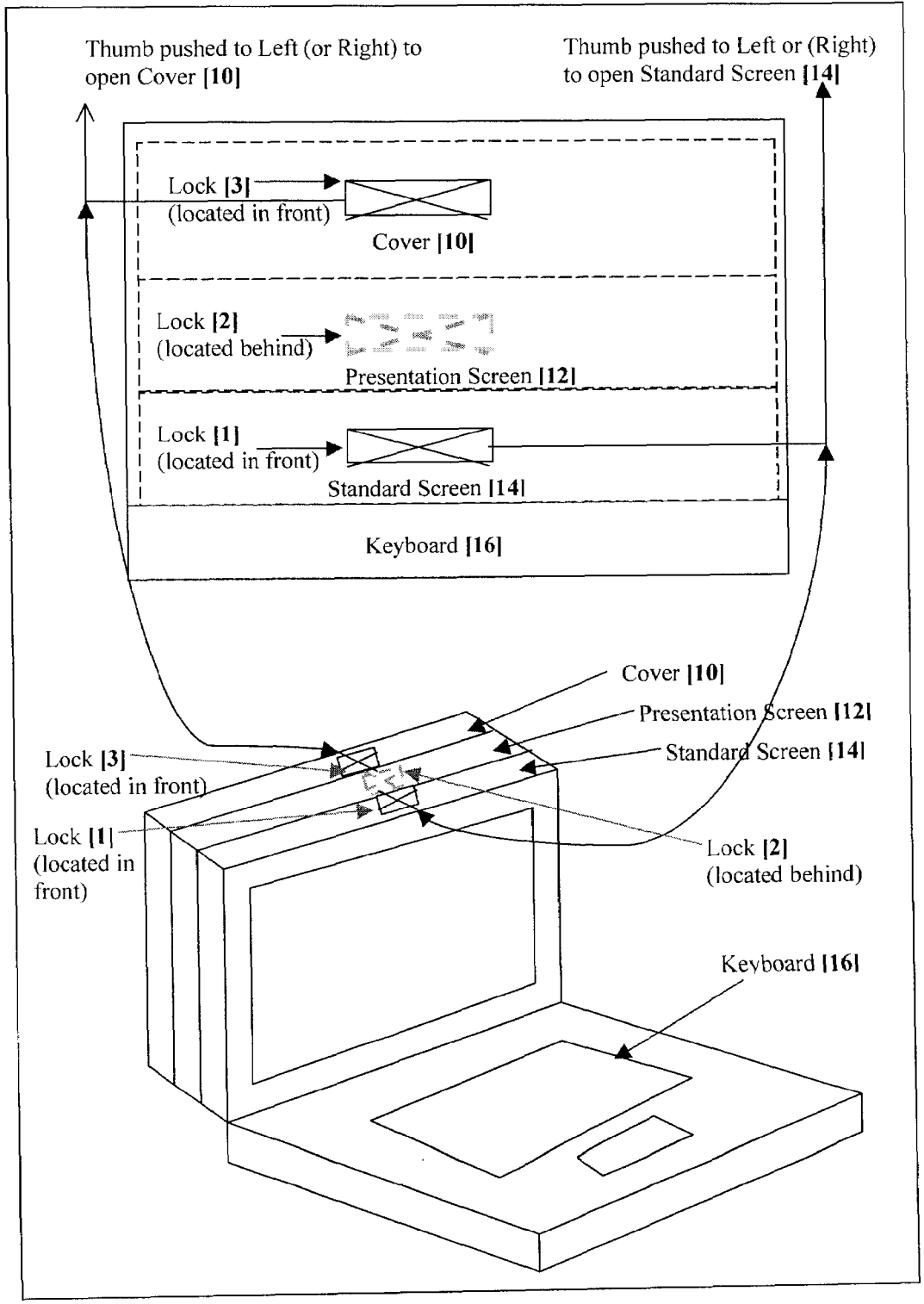
FIG. 4 shows the front view of the cover of the dual screen presentation notebook depicting its unique triple lock arrangement, when closed.
FIG. 4A is a perspective view showing the dual screen presentation notebook, with a cover open to display the standard screen.

FIGS. 4 and 4A show the front view of the dual screen presentation notebook depicting its unique triple lock arrangement. When the user is not giving a presentation to his/her client, he/she opens the first lock (Lock 1), which will open the Standard Screen 14, and he/she can then use the notebook the normal way notebooks are used. When the user is going to give a presentation to a client, he/she will then also open the second lock (Lock 2) and third lock (Lock 3) respectively. The second lock (Lock 2) serves two purposes i.e. (i) to open the Presentation Screen 12, and (ii) to simultaneously activate the Presentation Screen 12. One aspect of the invention is that unless the Presentation Screen 12 is opened, this monitor screen will not be illuminated and thus it will save and prolong the notebook's battery power when the user is using the notebook for his normal work.

Figure 5:
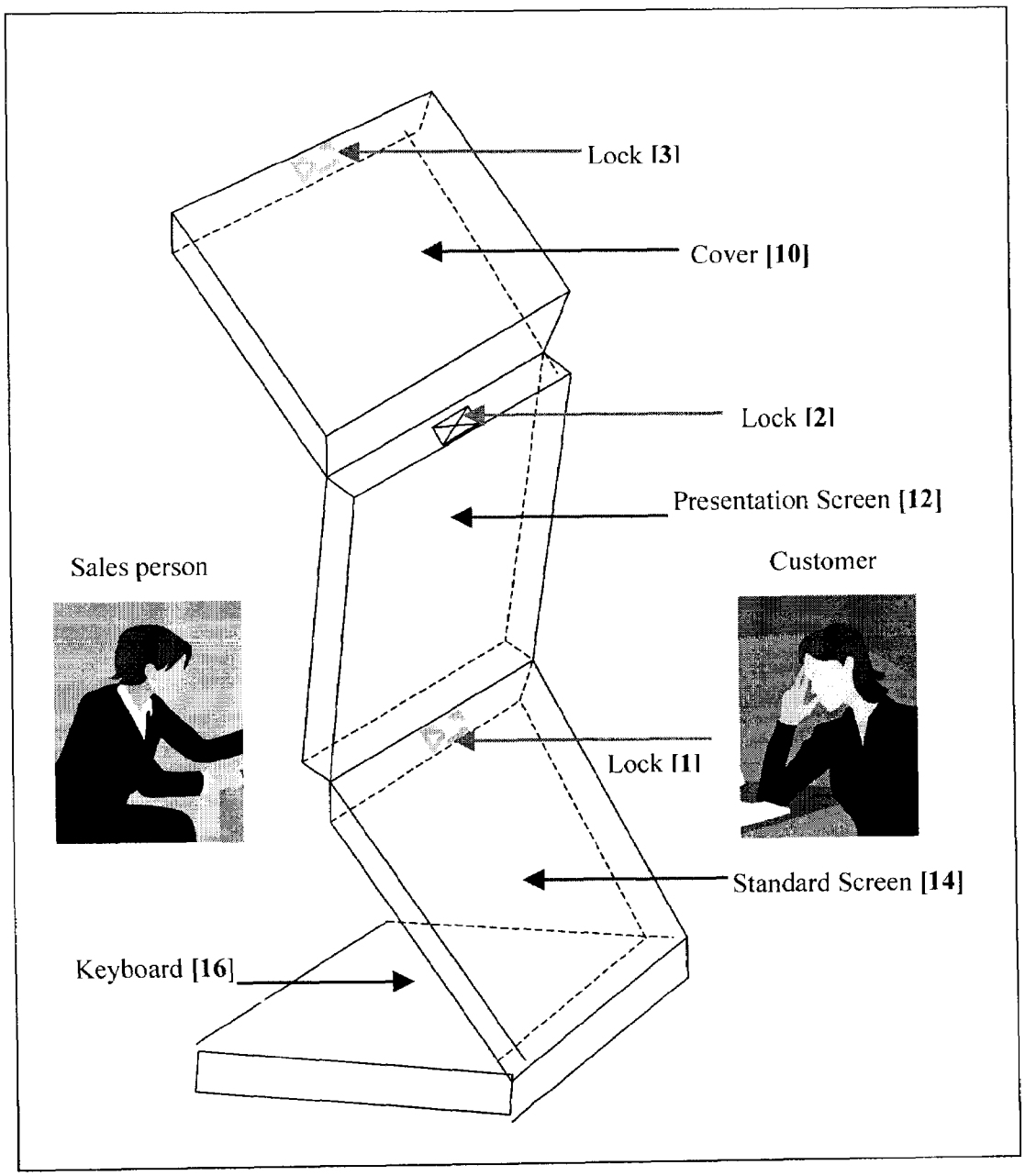
FIG. 5 shows how the triple locks are involved in opening up the presentation notebook computer for presentation to a customer.

FIG. 5 shows how the triple locks are involved in opening up the presentation notebook computer for presentation i.e.
  (i) Lock 1: opens the "Standard Screen 14" from the "Keyboard 16"
  (ii) Lock 2: opens the "Presentation Screen 12" from the "Standard Screen 14"
  (iii) Lock 3: opens "Cover 10" from the "Presentation Screen 12"

Figure 6:
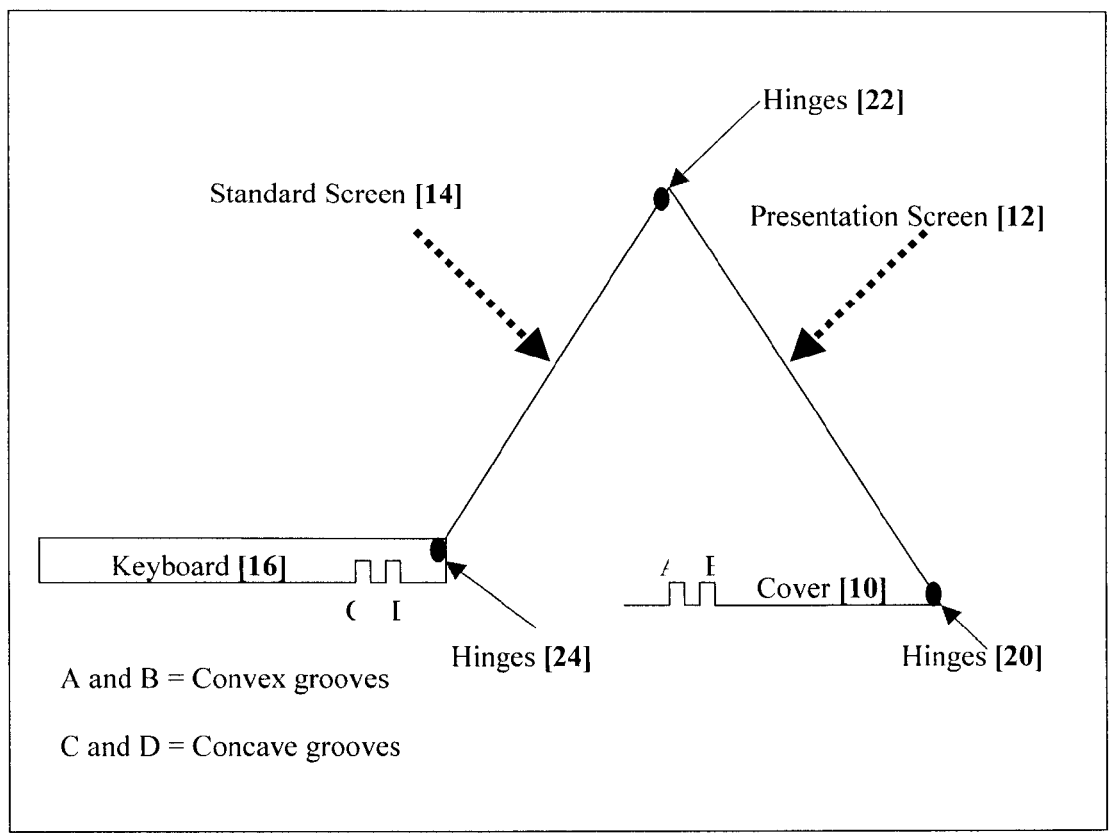
FIG. 6 is the right hand side view of the dual screen presentation notebook of the present invention, before securing the cover to the keyboard.

FIG. 6 is the right hand side view of the dual screen presentation notebook before securing the convex ridges A and B of the Cover 10, to the concave grooves C and D of the Keyboard 16. The Cover 10 is fixed so as to pivot to open and close against the Presentation Screen 12, by hinges 20. The Presentation Screen 12 is fixed so as to pivot to open and close against the Standard Screen 14, by hinges 22. The Standard Screen 14, is fixed to open and close against the Keyboard 16, by hinges 24.

Figure 7:
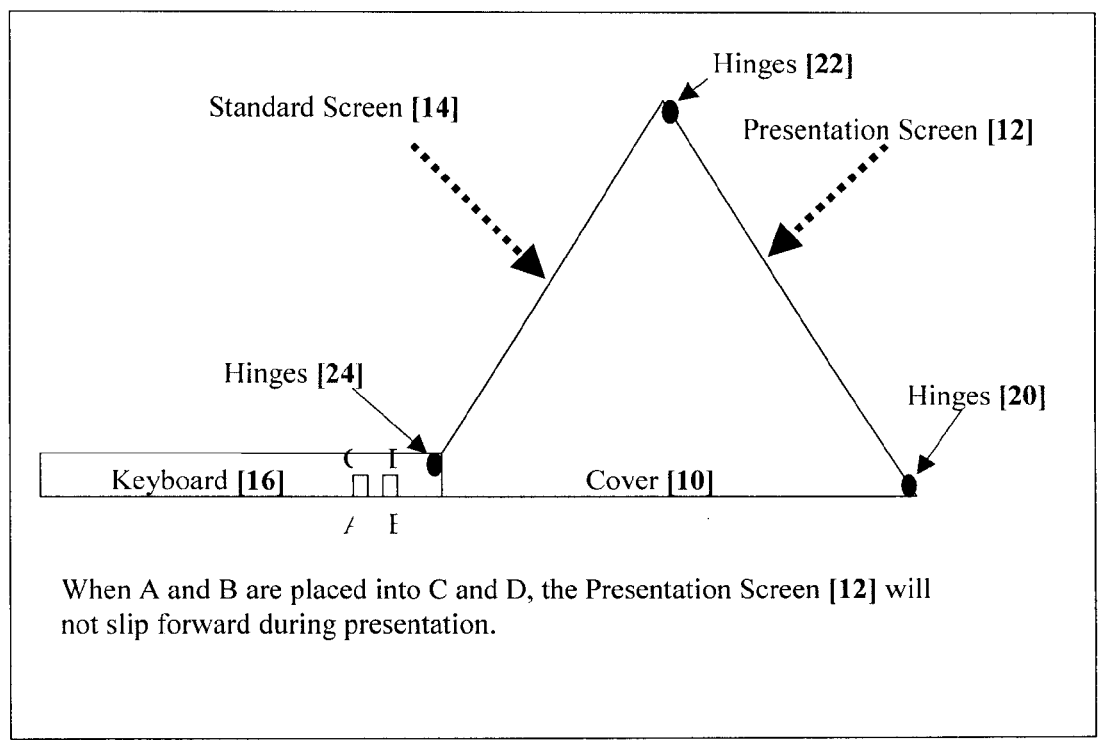
FIG. 7 is a right hand side view of the dual screen presentation notebook of the present invention, after securing cover to the keyboard.

FIG. 7 depicts the right hand side view of the dual screen presentation notebook after securing the convex ridges A and B of the Cover 10, in the concave grooves C and D of the Keyboard 16. When the convex ridges A and B are placed into the concave grooves C and D, the Presentation Screen 12, will not slip forward during presentation made by the user to the client. The present invention is designed to sit flat on a desk or table surface and can also be adapted to sit at a slight angle (not shown).

Figure 8:
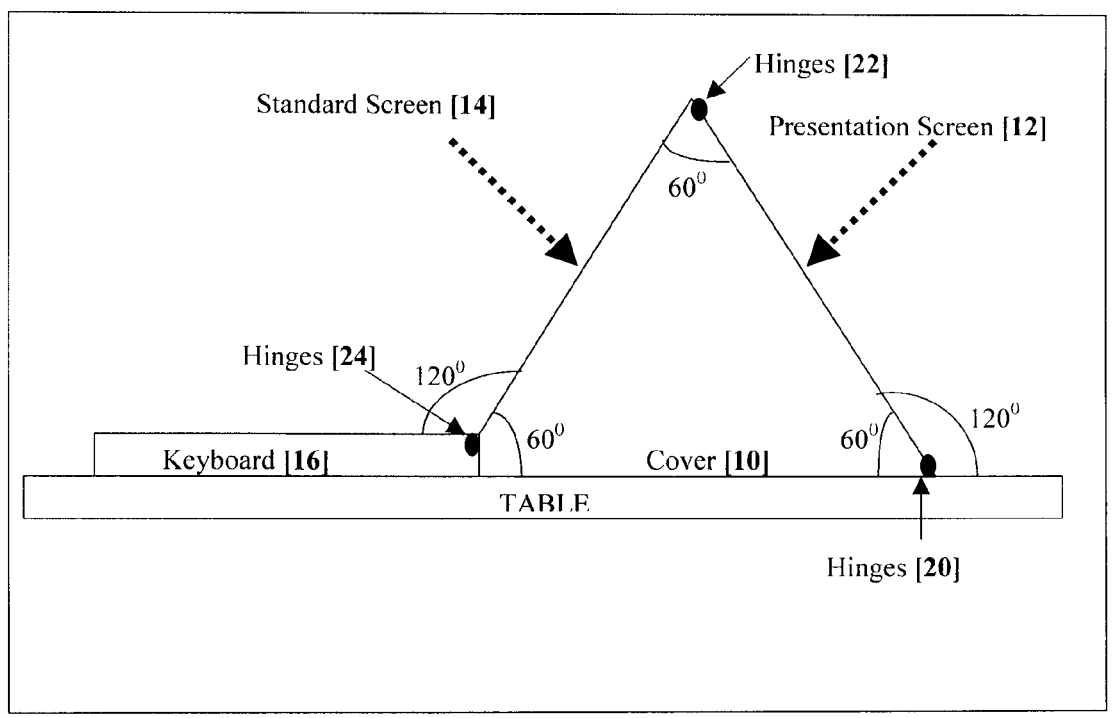
FIG. 8 is a right hand side view of the dual screen presentation notebook of the present invention, opened during presentation.
Figure 9:
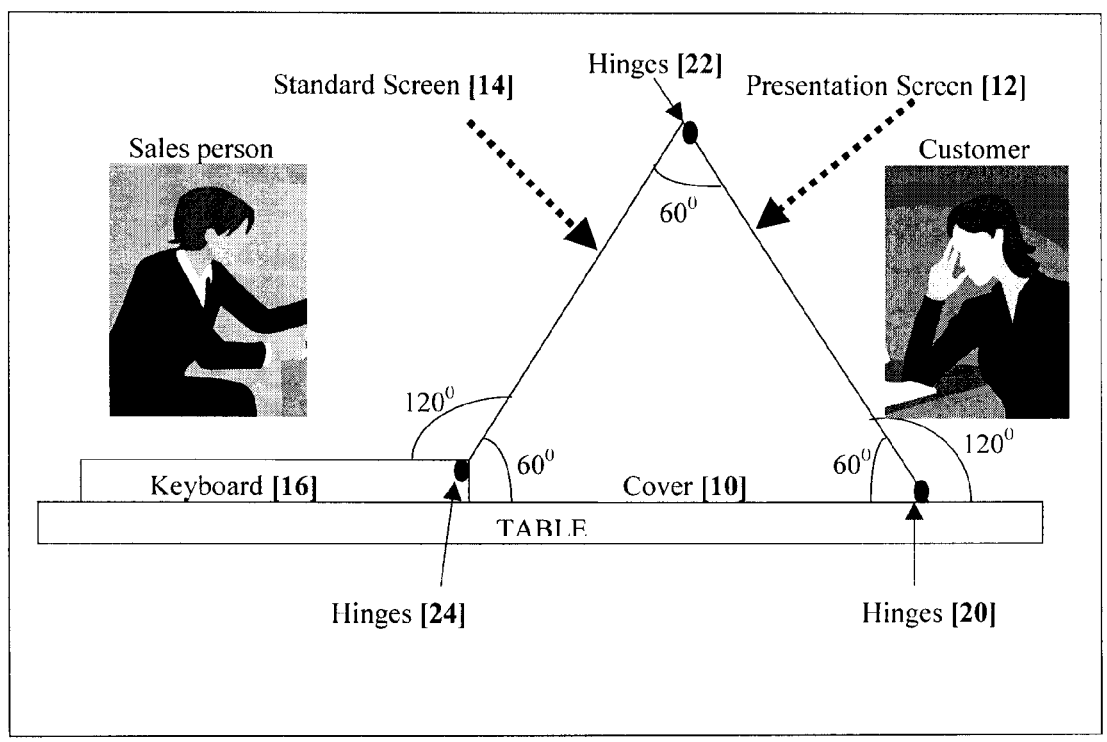
FIG. 9 is a right hand side view of the dual screen presentation notebook of the present invention, in action during presentation.

FIG. 8 is the right hand side view of the dual screen presentation notebook opened and ready for presentation. FIG. 9 shows the notebook in action during a presentation by the user to his/her client whereby both the user and his/her client are sitting comfortably opposite each other viewing the presentation on separate monitor screens. When the notebook is opened and powered up to give a presentation, the notebook is so designed that it can either (i) show identical or mirror images of the presentation materials on both the user's Standard Screen 14, and the client's Presentation Screen 12, or (ii) at the touch of a keyboard button, mouse or other buttons integral to the computer arrangement, it can show a different image on the user's Standard Screen 14, than the one that is shown on the user's client Presentation Screen 12. One aspect of this design is that the user may want check or see something that he/she does not want his/her client to see (for example to look at his/her internal cost data) while he/she is making a presentation to the client on the external price data.

Figure 10:
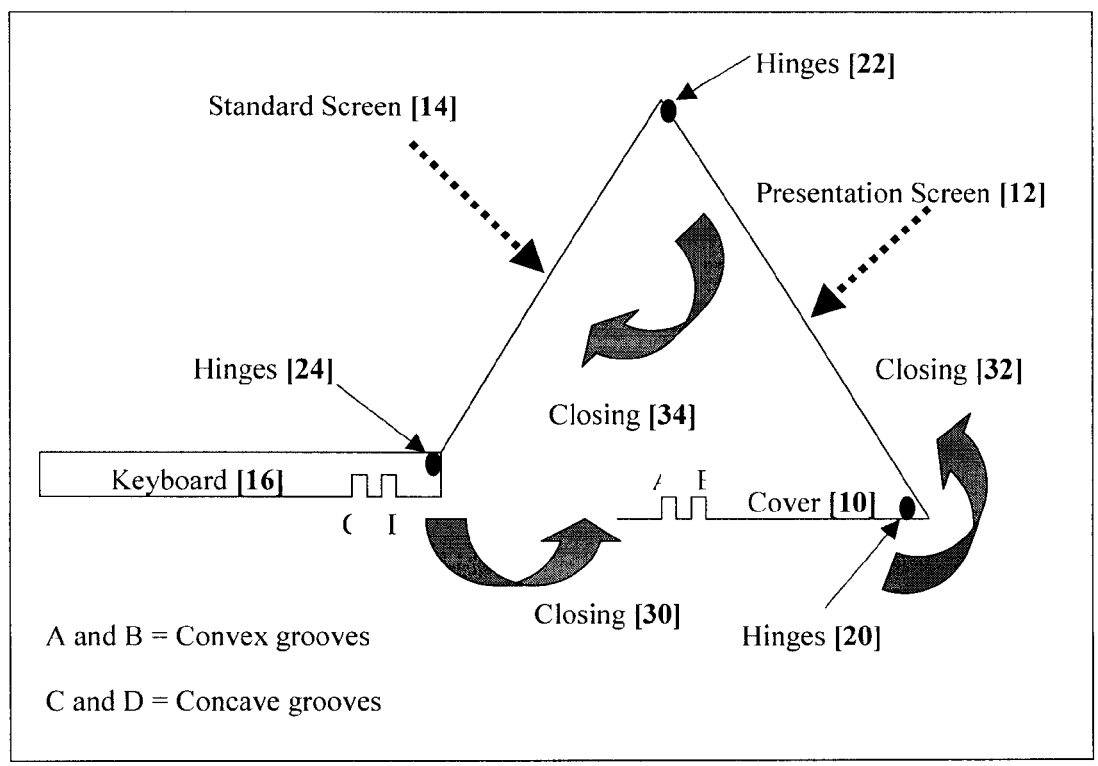
FIG. 10 is the right hand side view of the dual screen presentation notebook of the present invention showing an Action 1 initial steps in closing after presentation.
Figure 11:
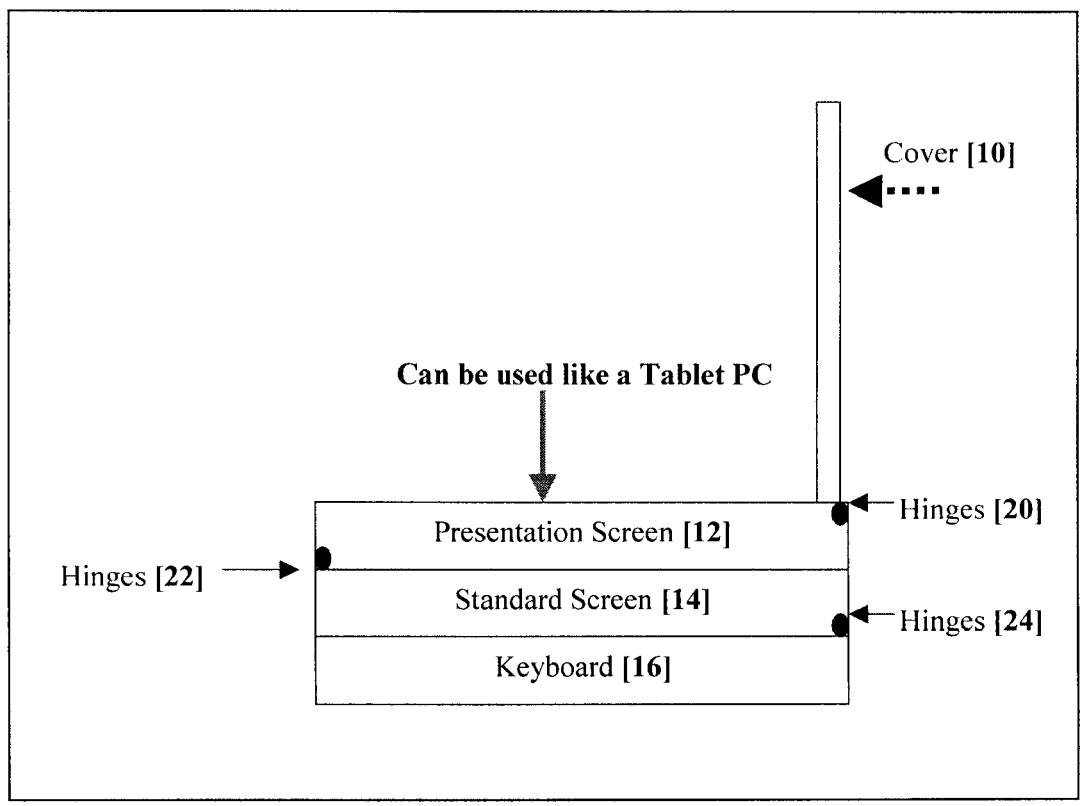
FIG. 11 is a right hand side view of the dual screen presentation notebook of the present invention showing an Action 2, which is the penultimate step in closing the notebook and whereby it can be used as a Tablet PC.
Figure 12:
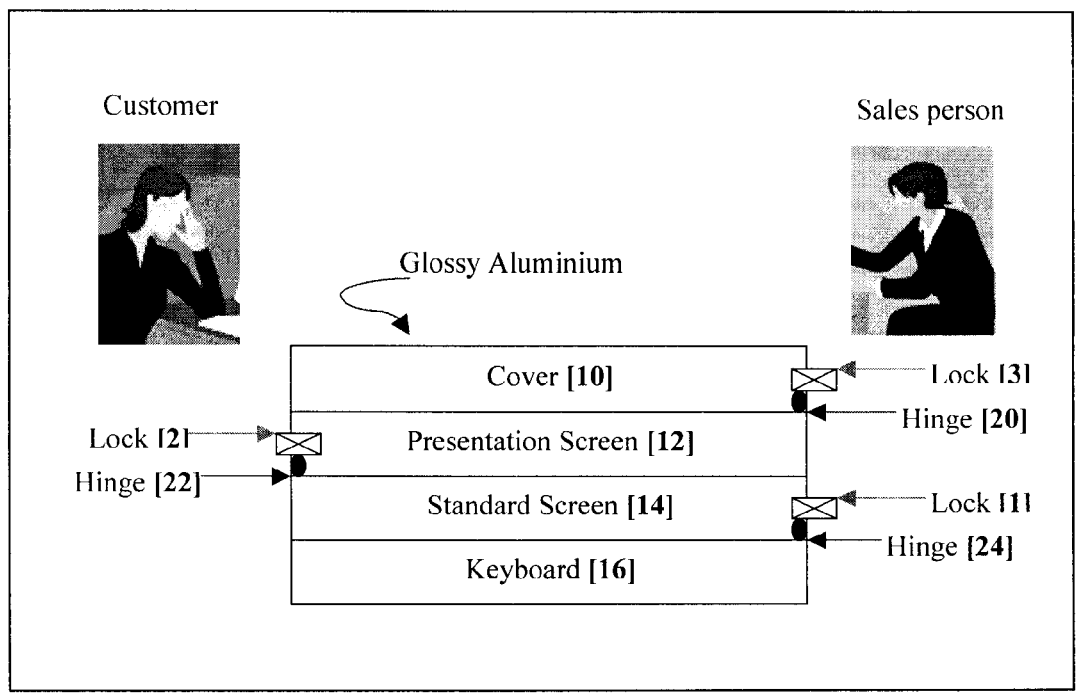
FIG. 12 is a right hand side view of the dual screen presentation notebook of the present invention, showing an Action 3, when the notebook is completely closed.

FIGS. 10 to 12 show the action mechanism and sequence in closing the dual screen presentation notebook after the presentation is completed.

FIG. 10 shows the ease with which the dual screen presentation notebook can be closed after the presentation is completed. In FIG. 10, Action 1 involves initially unhooking the convex ridges A and B of the Cover 10, from the concave grooves C and D of the Keyboard 16, as depicted by arrow 30. This is followed by closing the Cover 10, to the Presentation Screen 12, as depicted by arrow 32, and then closing the Presentation Screen 12, to the Standard Screen 14, as depicted by arrow 34.

In FIG. 11, Action 2 is the penultimate step in closing the notebook and whereby the notebook can now be used as a Tablet computer i.e. to function as a writing-based personal computer without the need to use a keyboard. The advantages of a Tablet computer are well documented in the computer industry and have generally been well accepted by users.

FIG. 12 is the right hand side view of the dual screen presentation notebook when it is completely closed (Action 3).

From the description above, a number of advantages of the invention become evident, and all of the objects of the invention set forth above are achieved:

(a) To provide a dual screen presentation notebook and method of use that provides advantages not taught by prior art.

(b) To provide a dual screen presentation notebook that has two monitor screens which will allow users to either (i) view identical or mirror images of the presentation materials or (ii) to show different images on the two monitor screens. One aspect of this design is that the user may want check or see something that he/she does not want his/her client to see for example to look at his/her internal cost data, while he/she is making a presentation to the client on the external price data.

(c) To provide a dual screen presentation notebook arrangement that consists of a clamshell case containing four component systems i.e.

(i) A protective device enclosure called a "Cover", similar to the primary casing of a commercial notebook computer. The Cover contains two convex ridges A and B on the front of the Cover and it is fixed so as to pivot to open and close against the Presentation Screen by hinges. The Cover has a lock (Lock 3) and this lock is located in front i.e. facing the user. When the user pushes his/her thumb to the left (or right) on Lock (3), it opens and separates the Cover from the Presentation Screen.

(ii) A "Presentation Screen" whereby the user's client can sit comfortably opposite the user and separately view the presentation being made by the user (without having to sit side by side close to the user). The Presentation Screen is fixed to open and close against the Standard Screen by hinges. The Presentation Screen has a lock (Lock 2) and this lock is located at the back i.e. facing the customer.

(iii) A "Standard Screen" whereby the user can view his/her presentation materials while he/she is conducting the presentation. The Standard Screen is fixed so as to pivot to open and close against the Keyboard by hinges. The Standard Screen has a lock (Lock 1) and this lock is located in front i.e. facing the user.

(iv) A "Keyboard" with the relevant controls and the CPU's and other hardware built underneath it, as is typical with a commercial notebook computer. The base of the Keyboard contains two concave grooves C and D and the Standard Screen is fixed to open and close against the Keyboard by hinges.

(d) To enable the easy storing of two monitor screens in a single integral assembly when not in use.

(e) To use the dual screen presentation notebook as a Tablet computer i.e. to function as a writing-based personal computer without the need to use a keyboard.

(f) To provide a dual screen presentation notebook that can be used for other current evolving applications such as for electronic book viewing, electronic photograph and images viewing, etc. Having a dual screen presentation notebook may spur the use of e-books as it may provide a more enjoyable reading experience of e-books (sharing and reading of e-books by more than one user at a time since the dual monitor screens will provide convenient portable viewing surfaces). Likewise, the sharing and viewing of videos, movies, electronic photographs and images, etc. is also easier and more enjoyable with such a dual screen presentation notebook. Users can be seated opposite one another and can view in comfort and with ease together.

While the present invention has been described with reference to at least one preferred embodiment, it will become apparent to those skilled in the art that the invention as described here is not limited thereto. Further objects and advantages of the invention including its simplicity to use will become clear to those who are skilled in the art after reviewing this description.

CONCLUSION, RAMIFICATION, AND SCOPE

Accordingly it will be realized that, in accordance with the present invention, a portable computer that has a dual screen design will allow users to view the presentation materials easily and effectively without the users having to sit side by side craning their necks close together facing the same direction but rather sitting opposite one another in comfort. When the dual screen presentation notebook is switched on, it will allow users to either (i) view identical or mirror images of the presentation materials or (ii) to show different images on the two monitor screens. The idea behind this design is that the user may want check or see something that he/she does not want his/her client to see for example to look at his/her internal cost data, while he/she is making a presentation to the client on the external price data. The present invention described here will greatly enhance the screen-viewing capability and satisfaction for the users.

The invention can readily and easily be converted to be used as a Tablet computer i.e. to function as a writing-based personal computer without the need to use a keyboard.

The present invention can also be used for other current evolving applications such as for electronic book viewing, electronic photograph viewing, etc. A dual screen presentation notebook may spur the use of e-books because it will provide a convenient portable viewing surface. Likewise, the viewing of videos, movies, electronic photographs and images, etc. may also be easier and more enjoyable with such a portable dual screen presentation notebook. Users can be seated opposite one another and can view in comfort and with ease together.

While the above description contains many specificities, these should not be construed as limitations on the scope of the invention, but as exemplifications of the presently preferred embodiments thereof. Many other ramifications and variations are possible within the teachings of the invention. The present invention can be used in many applications which are available or evolving today (as described above) and other technological applications that may become available in the near future.

Many variations of the invention are possible. For example, the part of the cover portion and the bottom surface of the keyboard portion can have anti-slide means of various kinds for keeping the part of the cover portion and the bottom surface of the keyboard portion from sliding with respect to one another when in contact. The anti-slide means may comprise a non-slide or friction surface on at least one of the cover portion and the keyboard portion.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A portable computer arrangement that includes a clamshell case containing a four component system, comprising:
   a keyboard portion having a keyboard and other computer hardware;
   a standard screen portion that is pivotally connected to said keyboard portion so as to pivot away from said keyboard portion and to pivot to cover said keyboard portion;
   a presentation screen portion that is pivotally connected to said standard screen portion so as to pivot away from a back of said standard screen portion and to pivot to cover said back of said standard screen portion; and
   a cover portion that is pivotally connected to said presentation screen portion so as to pivot away from said presentation screen portion and to pivot to cover said presentation screen portion; wherein
   said cover portion also pivots with respect to said presentation portion to a position wherein a part of said cover portion is in contact with a bottom surface of said keyboard portion; and
   said part of said cover portion and said bottom surface of said keyboard portion have complimentary shapes for keeping said part of said cover portion and said bottom surface of said keyboard portion from sliding with respect to one another when in contact.

2. The computer arrangement of claim 1, further comprising:
   a first lock mechanism for releaseably securing the standard screen portion to the keyboard portion;
   a second lock mechanism for releaseably securing the standard screen portion to the presentation screen portion; and
   a third lock mechanism for releaseably securing the presentation screen portion to the cover.

3. The computer arrangement of claim 1, wherein pivoting said presentation screen portion from said standard screen portion activates a screen associated with said presentation screen portion.

4. The computer arrangement of claim 1, further comprising a display control for causing a first image to be displayed on a first display associated with said display portion and a second image to be displayed on a second display associated with said presentation portion.

5. The computer arrangement of claim 4, wherein said first image and second image are identical.

6. The computer arrangement of claim 4, wherein said first image and said second image are different images.

7. The computer arrangement of claim 1, wherein said first image and said second image are mirror images of each other.

8. A portable computer arrangement that includes a clamshell case containing a four component system, comprising:
   a keyboard portion having a keyboard and other computer hardware;
   a standard screen portion that is pivotally connected to said keyboard portion so as to pivot away from said keyboard portion and to pivot to cover said keyboard portion;
   a presentation screen portion that is pivotally connected to said standard screen portion so as to pivot away from a back of said standard screen portion and to pivot to cover said back of said standard screen portion; and
   a cover portion that is pivotally connected to said presentation screen portion so as to pivot away from said presentation screen portion and to pivot to cover said presentation screen portion; wherein
   said cover portion also pivots with respect to said presentation portion to a position wherein a part of said cover portion is in contact with a bottom surface of said keyboard portion; and
   said part of said cover portion and said bottom surface of said keyboard portion have anti-slide means for keeping said part of said cover portion and said bottom surface of said keyboard portion from sliding with respect to one another when in contact.

9. The computer arrangement of claim 8, wherein said anti-slide means comprises a non-slide surface on at least one of said cover portion and said keyboard portion.

10. A portable computer arrangement that includes a clamshell case comprising a four component system, the four components being a protective cover portion, a presentation screen portion, a standard screen portion and a keyboard portion, wherein:
   (a) the protective cover portion contains two convex ridges on its front and it is fixed so as to pivot to open and close against the presentation screen portion by hinges, the cover portion having a first lock located at a front of the cover portion facing the user, and when the lock is unlocked, permits the cover to pivot from the presentation screen, (b) the presentation screen portion being positionable so that a person can sit comfortably opposite the user and separately view the presentation being made by the user, without having to sit side by side close to the user, the presentation screen portion being fixed to pivot by hinges to open and close against the standard screen, the presentation screen having a second lock located at the back facing the customer;

(c) the standard screen portion being for the user to view presentation materials while conducting a presentation, the standard screen portion being fixed to pivot by hinges to open and close against the keyboard portion, the standard screen having a third lock located in front facing the user; and (d) the keyboard portion having controls and hardware for a CPU built underneath it, wherein the base of the keyboard portion contains two concave grooves and when the convex ridges of the cover portion are placed into the concave grooves, so that the presentation screen portion will not slip forward during the presentation made by the user.

11. The computer arrangement of claim 10, designed to sit flat on a desk or table surface or adapted to sit at a slight angle with respect to the desk or table surface.

12. The computer arrangement of claim 10, wherein either a single or more than one computer processing unit (CPU) operates both of said displays.

13. The computer arrangement of claim 10, wherein the two monitor screens are integrally connected so that when the computer is switched on, it allow users who are sitting comfortably opposite to one another to either (i) view identical or mirror images of the presentation materials or (ii) show different images on the two monitor screens; whereby the user may check or see information that the user does not want another user or client to see.

14. The computer arrangement of claim 13, configured so that the information that the user does not want the client to see is confidential data, while the user is making a presentation to the client that relates to the confidential data.

15. The computer arrangement of claim 13, wherein the information that the user does not want the client to see is internal cost data, while the user is making a presentation to the client on external price data.

16. The computer arrangement of claim 10, useable for applications including electronic book viewing, electronic photograph and images viewing, sharing and viewing of videos, movies, electronic photographs and images, so as to provide a comfortable and enjoyable shared experience wherein users are seated opposite one another and can view in comfort and with ease simultaneously.

17. The computer arrangement of claim 10, further comprising a surface usable as a tablet, so that the computer arrangement functions as a writing-based personal computer, without the need to use a keyboard on said keyboard portion.

18. A portable computer arrangement that includes a clamshell case containing a four component system, comprising:
 a keyboard portion having a keyboard and other computer hardware;
 a standard screen portion that is pivotally connected to said keyboard portion so as to pivot away from said keyboard portion and to pivot to cover said keyboard portion;
 a presentation screen portion that is pivotally connected to said standard screen portion so as to pivot away from a back of said standard screen portion and to pivot to cover said back of said standard screen portion;
 a cover portion that is pivotally connected to said presentation screen portion so as to pivot away from said presentation screen portion and to pivot to cover said presentation screen portion; and
 a display control for causing a first image to be displayed on a first display associated with said display portion and a second image to be displayed on a second display associated with said presentation portion.

19. The computer arrangement of claim 18, wherein said first image and second image are identical.

20. The computer arrangement of claim 18, wherein said first image and said second image are different images.

* * * * *